UNITED STATES PATENT OFFICE.

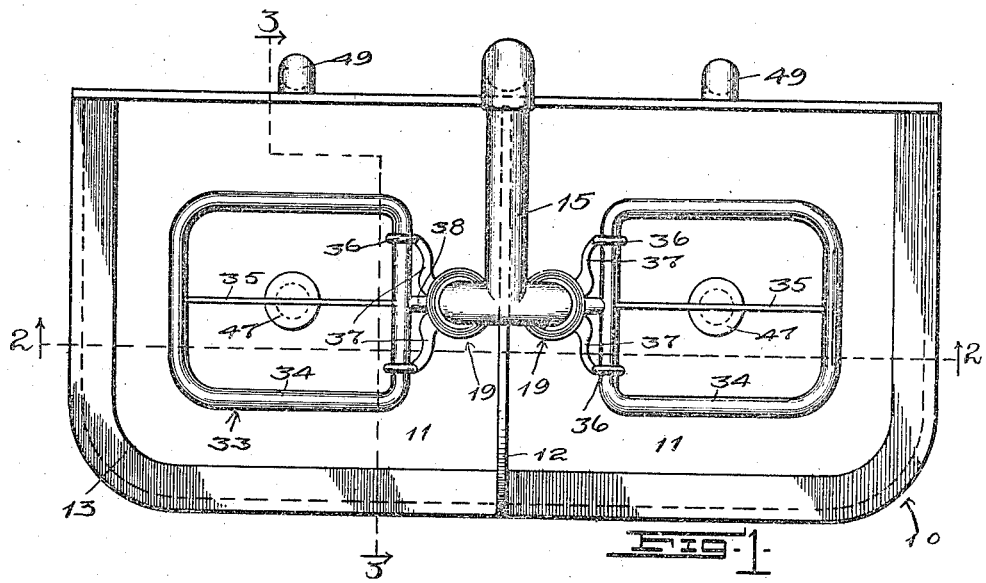
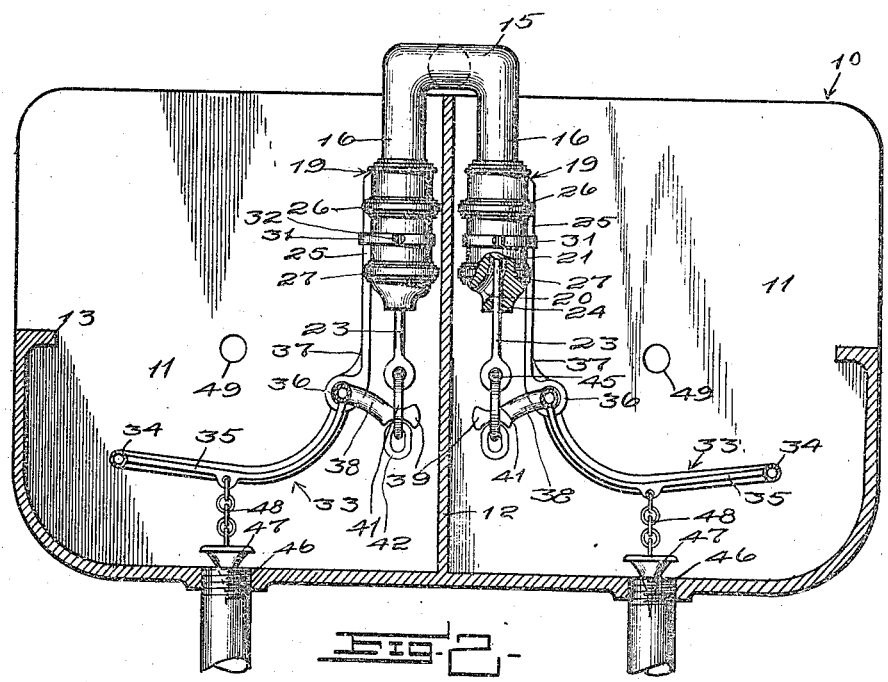

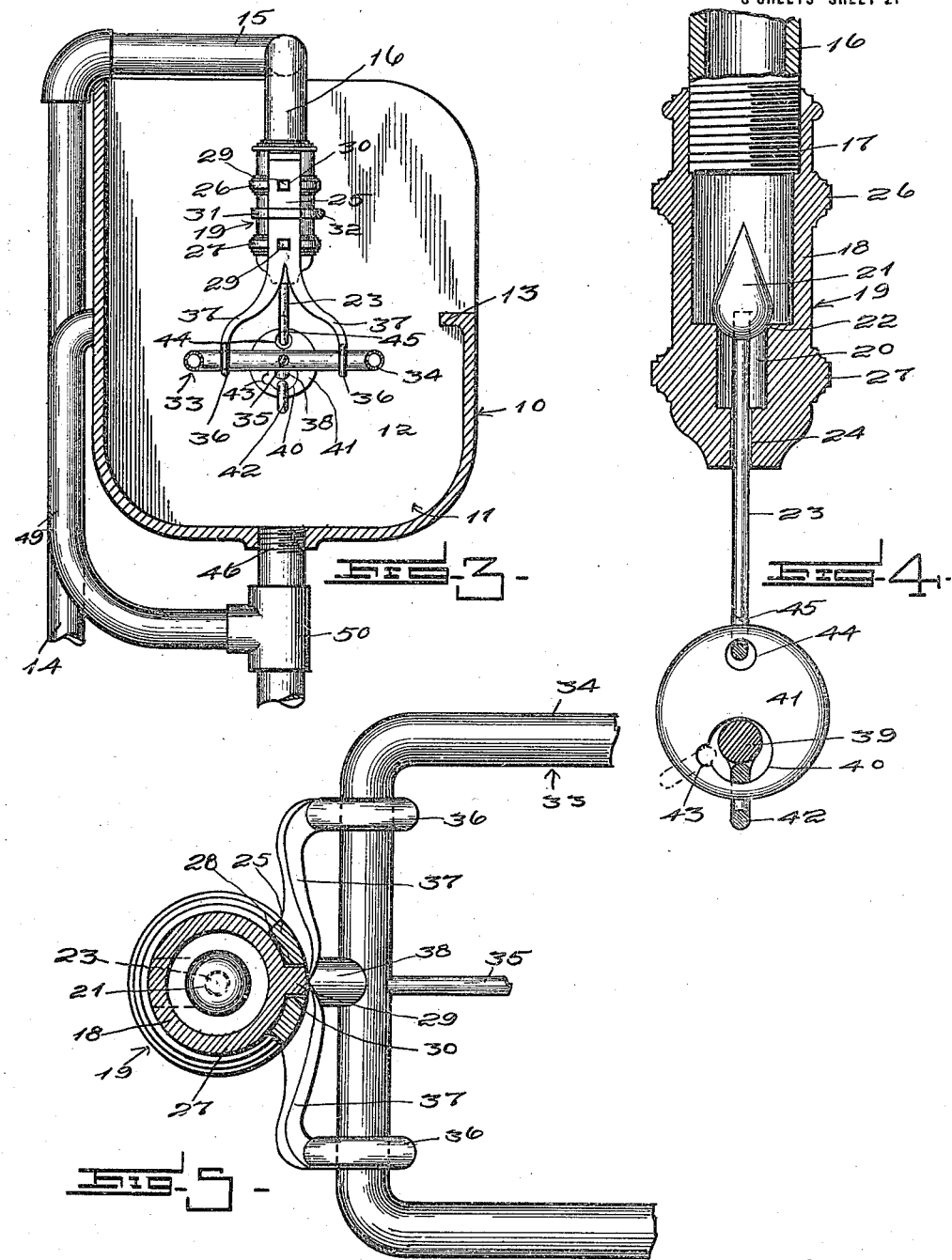

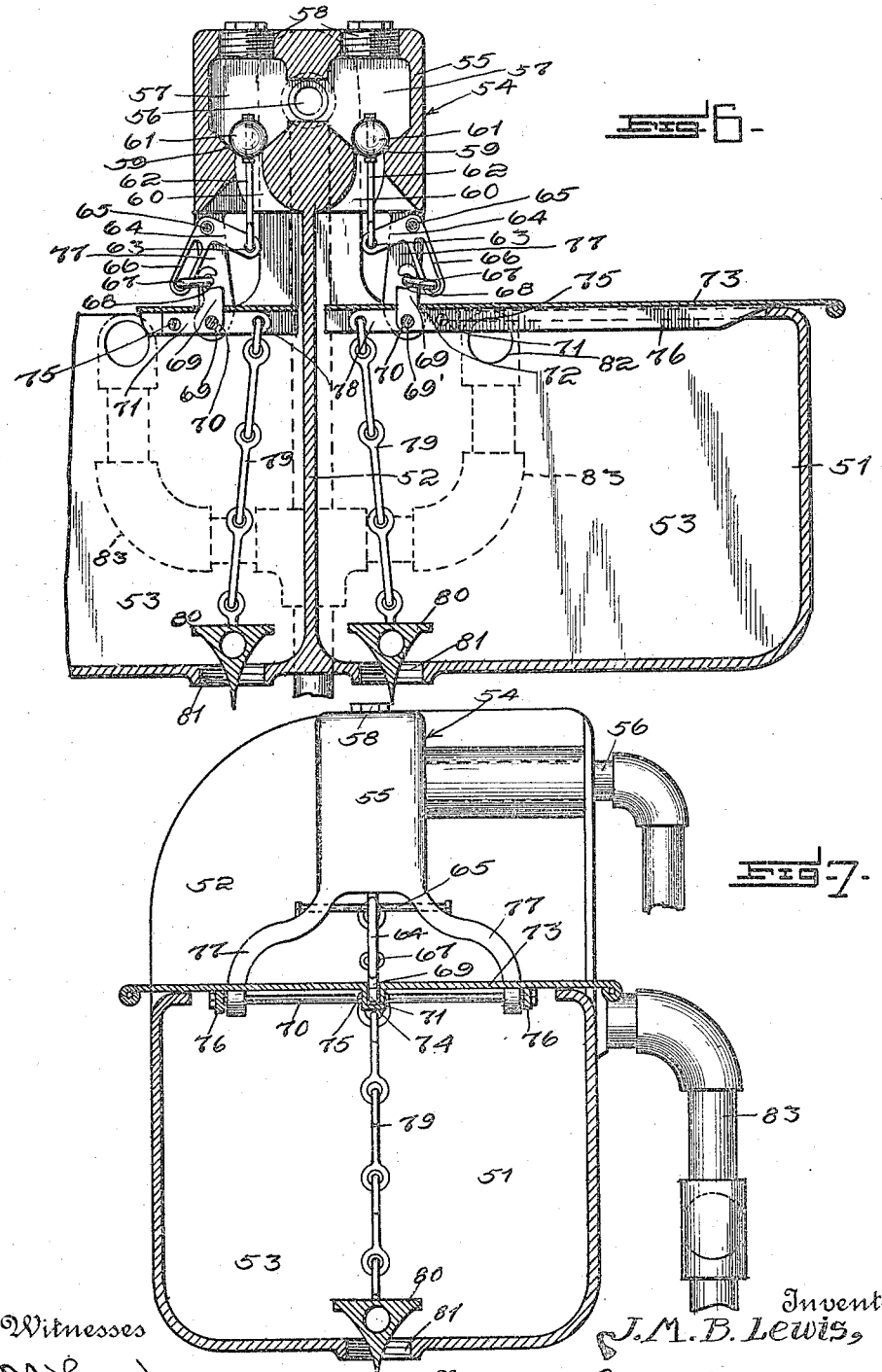

JOHN M. B. LEWIS, OF LYNCHBURG, VIRGINIA.

CATTLE DRINKING APPARATUS.

1,249,139. Specification of Letters Patent. Patented Dec. 4, 1917.

Application filed February 10, 1914. Serial No. 817,727.

*To all whom it may concern:*

Be it known that I, JOHN M. B. LEWIS, a citizen of the United States, residing at Lynchburg, in the county of Campbell and State of Virginia, have invented certain new and useful Improvements in Cattle Drinking Apparatus, of which the following is a specification.

My invention relates to improvements in drinking apparatus for cattle, such as cows, horses, or the like.

As it is well known, cattle, particularly cows, are very susceptible to tuberculosis. This disease, attacking one cow, is not infrequently transmitted to a large number, if not all, of the other cows, through the medium of the ordinary drinking system in use. It is generally customary to provide in such systems a trough or receptacle to hold the water, which is located in each stall. A common supply pipe is connected by means of branch pipes with a plurality of these troughs. The common supply pipe is ordinarily connected with a common supply tank, arranged at necessarily the same elevation as the troughs. Float control means are provided in connection with the supply tank, whereby a constant level of the water is maintained both in tank and troughs. In such a system, each animal has its own trough, but when each animal drinks out of its trough the level of the water in the entire system is reduced, which is compensated for by the supply of water from the tank. However, before this, the water from the troughs having a level above that of the level of the water in the trough from which the animal has drunk, flows back through the branch pipes into the main supply pipe, and not infrequently passes into the other trough or troughs of the system. By this means, if one of the cows should have tuberculosis or other contagious or infectious disease, the germs thereof will be distributed through the entire system, with the result that the disease is spread to other cows. When it is discovered that the entire system is thus infested with the tuberculosis germs, it is very difficult and expensive to sterilize or clean the same.

In contra-distinction to the ordinary drinking apparatus, or system, I propose to provide means whereby each cow will drink from a separate trough or receptacle, in a manner whereby the water coming in contact with the cow's mouth cannot under any condition flow back into the supply pipe of the system or into the other troughs or receptacles. I also propose to provide means whereby each trough is maintained in a highly sanitary condition, the same being so constructed that when it is discovered that any one trough is infested with tuberculosis or other germs, such trough may be thoroughly sterilized or cleaned, without in any way affecting the other troughs.

An important object of the invention is to provide means of the above mentioned character, whereby upon the movement of a control element either in the embodiment of a member arranged within the drinking receptacle or a cover therefor, the same being adapted to be moved by an animal, a supply of fresh water will be continuously fed into the trough from the upper end thereof, such water overflowing from the trough if the supply thereof is continued for a sufficiently long period, before the same can rise and come in contact with the supply means thereof, the water being discharged and thoroughly drained from the lower portion of the trough upon the cutting off of the supply of the same.

A further object of the invention is to provide means of the above mentioned character, which are comparatively simple in construction, inexpensive to manufacture, convenient in use, easy to sterilize and clean, strong and durable.

A further object of the invention is to provide means of the above mentioned character, formed of few and simple parts which may be readily separated and assembled.

Other objects and advantages of this invention will be apparent during the course of the following description.

In the accompanying drawings forming a part of this specification and in which like numerals are employed to designate like parts throughout the same, Figure 1 is a plan view of apparatus embodying my invention, Fig. 2 is a longitudinal sectional view taken on line 2—2 of Fig. 1, Fig. 3 is a transverse sectional view taken on line 3—3 of Fig. 1, Fig. 4 is an enlarged detail sectional view through a valve structure included in the invention, Fig. 5 is an enlarged detail horizontal section taken through a portion of the valve structure, showing means for attaching a support thereto, Fig. 6 is a central longitudinal sectional view through apparatus embodying a slightly different form of my invention, and, Fig. 7 is a transverse sectional view taken on line 7—7 of Fig. 6.

In the drawings, wherein for the purpose of illustration is shown a preferred embodiment of my invention, the numeral 10 designates a drinking trough or receptacle, as a whole, preferably divided into a plurality of drinking chambers 11, in the present instance two, by a transverse partition 12. The trough or receptacle 10 has its forward side and ends terminating at a point substantially below the upper edge of the back and transverse partition 12, as shown. The forward side and ends are provided at their upper edges with an inwardly extending horizontal flange or lip 13 to prevent the splashing of the water out of the trough, while the animal is drinking.

The numeral 14 designates a preferably vertically arranged water supply pipe having connection with a source of supply of water under suitable pressure (not shown). This pipe 14 preferably extends behind the back of the trough or receptacle 10, adjacent the partition 12, with its upper end connected with a T-coupling 15, which overhangs the partition 12, as shown. This T-coupling is provided with depending outlet portions 16, arranged upon opposite sides of the partition 12, to supply the water to the chambers 11.

As more clearly shown in Fig. 4, the lower ends of each of the outlet portions 16 of the T-coupling, is screw-threaded, as shown at 17, for screw-threaded engagement within the intake end of a valve casing or chamber 18 of a supply valve structure, designated as a whole by the numeral 19. This valve casing 18 is vertically arranged adjacent the partition 12, and is provided with a water outlet or port 20, preferably curved to extend rearwardly or inwardly toward the partition 12. The supply of water to this outlet 20 is controlled by a vertically movable inverted approximately heart-shaped valve 21 engaging and disengaging a valve seat 22. The valve 21 is connected with a depending valve rod or stem 23 passing through a suitable opening 24 in the lower closed end of the casing 18, as shown.

The numeral 25 designates a preferably vertically arranged support or strip, adapted to be disposed upon preferably the outer side of the valve casing 18, in engagement with annular flanges or ribs 26 and 27. As more clearly shown in Fig. 5, each annular flange or rib 27 is provided with spaced openings 28, and an outwardly extending lug 29 therein. The support 25 is adapted to fit snugly within each opening 28 and is provided with an opening 30, for snugly receiving the lug 29. The upper end of the support 25, when in its operative position, is preferably arranged below and in engagement with the uppermost flange or rib 26, as shown. The support 25 is bound or held to the casing 18 by a ring or band 31, the ends of which are connected by a bolt 32.

The numeral 33 designates a control device, to be preferably moved by the animal for supplying water into the trough. In the present instance, I have shown this control device as being in the embodiment of a preferably rectangular open tubular frame 34, extending longitudinally of the chamber 11. Extending longitudinally of the open frame 34 and connected with the opposite ends thereof is a rod 35, adapted to be engaged by the nose or mouth of the animal. The inner end of the frame 34 is pivotally mounted within eyes or loops 36, formed upon downwardly diverging arms 37, rigidly connected with the support 25 and preferably formed integral therewith. It is thus seen that the arms 37 provided with the eyes 36 afford a pivotal connection between the frame 34 and the support 25, whereby the frame will be free to swing in a substantially vertical plane, and will not be liable to derangement, such as binding. Rigidly connected with the inner end of the frame 34 is a crank arm 38, provided with an approximately frustoconically shaped head 39, increasing in diameter toward its free end. The crank arm 38 is preferably formed of solid iron or other suitable material. The head 39 is adapted for insertion within a preferably circular opening 40 of a plate-link 41 and is normally retained therein by means of a lock link 42, adapted to be shifted upwardly to enter an opening or recess 43, whereby the head 39 may be withdrawn from the opening 40. It is obvious that the lock link 42 is retained by gravity in the lowermost position, whereby the same serves to positively prevent the withdrawal of the head 39 from the opening 40, but the link 42 may be readily manipulated, whereby the head 39 may be disconnected from the plate link 41. The link 41 is provided near its upper portion with an opening 44 for receiving a loop or eye 45 of the valve rod 22. At this point it is thought advisable to call attention to the fact that the weight of the valve 21, valve rod 23, crank arm 38, and connecting means between the same and the valve rod 23 is sufficient to overcome the weight of the frame 34 and associated elements, whereby the frame is normally retained in the uppermost position.

Each drinking chamber is provided in its bottom with a drain outlet 46, here illustrated as a pipe or conduit 46. The intake end of this pipe or conduit is adapted to be closed by a preferably conical valve 47, decreasing in diameter downwardly, and normally arranged above and spaced from the inlet end of the pipe 46. The valve 45 is suspended by a chain or connecting element 48 attached to the longitudinal rod 35, as shown.

Each chamber 11 is provided with an over-flow outlet means 49, preferably in the form of a pipe, connected with the drain outlet pipe 46, through the medium of a T-coupling 50. Particular attention is called to the fact that the intake end of the over-flow pipe 49 is in communication with the interior of the chamber 11 at a point spaced a substantial distance below the outlet end of the supply port 20 of the supply valve, whereby the water held within the chamber can not possibly come in contact with the supply valve, to contaminate the water in the supply pipe.

In operation, the cow or other animal, instinctively engages the control element 33 with its nose or mouth, pushes the same downwardly, whereby the valve 21 is unseated, and the valve 47 seated. The water is now supplied into the drinking chamber 11, the animal retaining the control element 33 depressed while drinking. If the supply of water exceeds the rate at which it is being consumed by the animal, when the level thereof reaches the outlet 49, it will pass therethrough and be carried off through the pipe 46, without possibly coming in contact with the supply valve. When the animal has satisfied its thirst, it releases the control element 33, whereby the same is automatically swung to its uppermost position by the downward movement of the valve 21 and associated elements, such upward movement of the control element unseating valve 47 and allowing the water remaining in the drinking chamber to be drained through pipe 46, whereby there will be no accumulation of the water for a prolonged period within the drinking chamber.

The form of my invention shown in Figs. 6 and 7 includes a trough 51, divided by a transverse partition 52, forming a plurality of drinking chambers 53, preferably arranged in end to end relation, as shown.

Arranged above and suitably supported by the transverse partition 52 is a valve structure 54 embodying a shell 55, having a common centrally arranged inlet or supply opening 56, in communication with chambers 57, as shown. The upper end of the chambers 57 are normally closed by means of removable screw-threaded plugs or caps 58. The bottom of each chamber 57 is preferably in the form of a conical wall or valve seat 59, controlling the passage of the water through an inwardly discharging passage or port 60, leading into the drinking chamber 53, adjacent the transverse partition 52 and upon one side thereof, as shown. Each valve seat 59 is adapted to be engaged and disengaged by a preferably spherical valve 61, rigidly mounted upon the upper end of a vertically reciprocatory valve rod 62, having its lower end pivoted, as shown at 63, to a bell-crank lever 64. This bell-crank lever is pivoted, as shown at 65.

Each bell-crank lever 64 has its approximately vertical arm provided with a longitudinally extending slot 66, receiving a pivotal connecting link 67, fitting within an opening or notch 68, in an upstanding crank or finger 69, as shown.

The crank 69 is apertured, as shown at 69', for receiving a transverse rod 70, and is provided at its lower end with a lateral extension 71. The crank 69 passes through an opening 72 in a pivoted control device 73, in this instance serving as a cover for the drinking chamber 53. At this point it is thought advisable to state that the cover 73 is considered to be the equivalent of the control device or element 33 described in the first form of my invention, and that whenever the term "control device," without further restriction, is employed in the claims, it is intended that the same should cover both forms of them. The lateral extension 71 is arranged within a depending pocket 74 carried by the control device or cover 73 and is rigidly secured therein by means of a transverse bolt 75 or the like. The control device or cover 73 is provided with laterally spaced longitudinally extending ribs or flanges 76, depending from the inner or lower surface of control device or cover 73, as shown. The rear ends of these ribs or flanges 76 are apertured for pivotal connection with the rod 70, which passes through the apertured ends of downwardly diverging arms 77 carried by and preferably cast integral with the lower end of the shell 55, as shown. Rigidly connected with the upstanding crank or finger 69 is a normally horizontally arranged crank 78, the outer end of which is apertured for connection with a chain 79, connected with a discharge valve 80, which is preferably substantially conical and decreases in diameter downwardly, as shown. The discharge valve 80 is adapted to control the passage of water through a discharge opening 81, in the bottom of the chamber 53.

Each chamber is provided near its upper end and below the control device or cover, when the latter is in its closed position, with an over-flow opening 82, connected with a take-off pipe 83, as shown.

The operation of the second form of my invention is as follows:—

When the control device or cover 73 occupies its horizontal or closed position, the same serves to cover the upper open end of the drinking chamber 53, thus preventing weeds or other dirt from entering the same. When the control device or cover 73 is in its closed position, the inlet valve 61 is seated and the outlet valve 80 is unseated, as shown. The cow or the like swings the control device or cover 73 upwardly, to occupy a substantially vertical position, whereby the cranks 69 and 78 are swung upon their pivots. Upon this movement of the crank 69, the bell-crank lever 64 is swung upon its pivot, whereby the inlet valve 61 will be unseated, and the water supplied into the chamber 53 through port 60. Simultaneously with the unseating of the valve 61, the valve 80 is seated to prevent the passage of the water from the drinking chamber 53.

It is to be understood that the forms of my invention herewith shown and described are to be taken as preferred examples of the same and that various changes in the shape, size and arrangement of parts may be resorted to without departing from the spirit of the invention or the scope of the subjoined claims.

Having described my invention, I claim:—

1. Apparatus of the character described, comprising a drinking receptacle, a suitably supported valve structure for supplying water to the upper portion of the receptacle and comprising an upstanding casing provided with laterally extending securing lugs and a movable valve arranged therein, a supporting element provided with openings to receive the securing lugs and having its lower end forked to provide depending diverging arms having pivot eyes at their lower ends, a securing band surrounding the supporting element and valve casing to hold the former upon the latter, an approximately rectangular open frame having one end thereof pivotally mounted within the pivot eyes of said arms, and operative connecting means between the approximately rectangular frame and the movable valve.

2. Apparatus of the character described, comprising a drinking receptacle, a supply valve structure arranged near the upper end thereof and embodying a movable valve, a depending rod connected with the movable valve and provided at its lower end with an eye, a plate-link provided in its upper portion with an opening to receive the eye of the depending rod and in its lower portion with a relatively large opening having its wall provided with a radially extending recess, a crank provided with a tapered head increasing in diameter outwardly and adapted for insertion through the relatively large opening, a lock-link having a portion thereof arranged within the relatively large opening to normally prevent the tapered head from being removed therefrom and adapted for movement into the radially extending recess to permit of the separation of these parts, and a control device connected with the crank to move the same.

3. Apparatus of the character described, comprising a drinking receptacle having its upper side open, a substantially vertical valve casing arranged above the upper side of the receptacle and having its outlet end spaced a substantial vertical distance above the maximum water level of the receptacle and provided with a vertically inclined discharge outlet for conducting the water toward the rear wall of the receptacle, a valve arranged within the casing above the inclined discharge outlet, a valve rod connected with the valve depending therefrom with its lower end in advance of the lower end of the discharge outlet, a supporting member secured to the forward side of the valve casing and carrying depending spaced arms arranged forwardly of the valve rod, a control member pivotally mounted upon the arms, means connecting the control member and the valve rod, a valve arranged in the lower portion of the receptacle to control the discharge of water therefrom, and means connecting the last named valve with the control member.

4. In apparatus of the character described, a plurality of drinking receptacles, a common water supply conduit for the receptacles, an inlet conduit for each receptacle connected with the common water supply conduit and having its discharge end arranged above the maximum water level of the receptacle so that the water cannot flow from the receptacle back into the common water supply conduit, a normally closed inlet valve associated with the inlet conduit, a normally open outlet valve associated with the drinking receptacle whereby it is normally empty, a movable member arranged within the receptacle and adapted to be actuated by the mouth of the animal and connected with the inlet and outlet valves to operate them, and a support for the member arranged to prevent the animal's mouth from contacting with the discharge end of the inlet conduit.

5. In apparatus of the character described, a plurality of drinking receptacles, a common water supply conduit for the receptacles, an inlet conduit for each receptacle connected with the common water supply conduit and having its discharge end arranged above the maximum water level of the receptacle so that the water cannot flow from the receptacle back into the common water supply conduit, a normally closed inlet valve associated with the inlet conduit, a normally open outlet valve associated with the drinking receptacle whereby it is normally empty, and a movable member arranged near the receptacle and adapted to be actuated by the mouth of the animal and connected with the inlet and outlet valves to operate them.

6. In apparatus of the character described, a drinking receptacle, a normally open outlet valve for the drinking receptacle whereby it is normally empty, an inlet valve casing arranged above the receptacle and having a rearwardly extending outlet opening which is spaced a substantial distance above the maximum water level of the receptacle, a normally closed inlet valve arranged within the inlet valve casing, a swinging member arranged within the receptacle and adapted to be moved by the mouth of the animal, a support secured to the forward portion of the inlet valve casing and pivotally supporting the swinging member, and means connecting the swinging member and the inlet and outlet valves.

In testimony whereof I affix my signature in presence of two witnesses.

JOHN M. B. LEWIS.

Witnesses:
G. H. WILKINS,
VOLNEY E. HOWARD.

Copies of this patent may be obtained for five cents each, by addressing the "Commissioner of Patents, Washington, D. C."